United States Patent
Huwer

(10) Patent No.: US 10,316,876 B2
(45) Date of Patent: Jun. 11, 2019

(54) CONNECTING ELEMENT WITH PROFILE RAILS

(71) Applicant: Knauf Gips KG, Iphofen (DE)

(72) Inventor: Thomas Huwer, Oberreidenbach (DE)

(73) Assignee: Knauf Gips KG, Iphofen (DE)

( * ) Notice: Subject to any disclaimer, the term of this patent is extended or adjusted under 35 U.S.C. 154(b) by 0 days.

(21) Appl. No.: 14/914,357

(22) PCT Filed: Aug. 22, 2014

(86) PCT No.: PCT/EP2014/002304
§ 371 (c)(1),
(2) Date: Feb. 25, 2016

(87) PCT Pub. No.: WO2015/028131
PCT Pub. Date: Mar. 5, 2015

(65) Prior Publication Data
US 2016/0201323 A1    Jul. 14, 2016

(30) Foreign Application Priority Data

Aug. 28, 2013  (DE) .................... 20 2013 007 676 U

(51) Int. Cl.
*F16B 7/04* (2006.01)
*E04B 9/24* (2006.01)
*E04B 9/10* (2006.01)

(52) U.S. Cl.
CPC .............. *F16B 7/0413* (2013.01); *E04B 9/10* (2013.01); *E04B 9/247* (2013.01); *Y10T 403/55* (2015.01)

(58) Field of Classification Search
CPC .......... E05B 9/247; E05B 9/10; E04B 1/5818; F16B 7/0413; F16B 7/042; F16B 7/0446; F16B 7/22; Y10T 403/55; Y10T 403/7098
(Continued)

(56) References Cited

U.S. PATENT DOCUMENTS 5,560,731 A * 10/1996 Kronenberg ............ E06B 3/667
403/292
6,431,784 B1 * 8/2002 Kronenberg ............ E06B 3/667
403/292

(Continued)

FOREIGN PATENT DOCUMENTS

DE     2109117 A1    9/1972
DE     3048946 A1 *  7/1982  ............... E04B 9/10
(Continued)

OTHER PUBLICATIONS

Translation of DE 4322631. Connector for C-profiles. Knauf, Jean. Jan. 19, 1995.*
(Continued)

*Primary Examiner* — Josh Skroupa
*Assistant Examiner* — Cory B Siegert
(74) *Attorney, Agent, or Firm* — The Webb Law Firm

(57) ABSTRACT

The invention relates to a connecting element for connecting two aligned C-shaped profile rails (12). The connecting in element (10) is in the form of a sheet metal profile the cross-section of which, adapted to the profile rails (12) to be connected, is such that said sheet-metal profile can be slid into said profile rails (12) from the fronts thereof in a captive manner. A handling tab (14) that is accessible after the connecting element has been slid into a profile rail (12) is moulded onto or mounted on said connecting element.

9 Claims, 4 Drawing Sheets

(58) Field of Classification Search
USPC .................................................. 403/292, 383
See application file for complete search history.

(56) References Cited

U.S. PATENT DOCUMENTS

| | | | | |
|---|---|---|---|---|
| 6,568,873 | B1* | 5/2003 | Peterson | E06B 3/667 |
| | | | | 403/300 |
| 6,862,859 | B2* | 3/2005 | Kronenberg | E06B 3/667 |
| | | | | 403/295 |
| 7,070,356 | B2* | 7/2006 | Kronenberg | E06B 3/667 |
| | | | | 403/292 |
| 8,297,871 | B2* | 10/2012 | Kronenberg | E06B 3/667 |
| | | | | 403/292 |
| 2011/0203198 | A1* | 8/2011 | Kronenberg | E06B 3/667 |
| | | | | 52/204.593 |
| 2014/0112711 | A1 | 4/2014 | Hertweck et al. | |

FOREIGN PATENT DOCUMENTS

| | | | | |
|---|---|---|---|---|
| DE | 4322631 | A1 | 1/1995 | |
| DE | 4446227 | A1 | 8/1995 | |
| DE | 10332681 | A1 | 3/2005 | |
| DE | 102011015435 | A1 | 10/2012 | |
| EP | 1561875 | A1 * | 8/2005 | ............. E04B 9/064 |
| EP | 1741849 | A1 | 1/2007 | |
| EP | 2397618 | A1 * | 12/2011 | ............. E04B 9/183 |
| FR | 2900219 | A1 | 10/2007 | |
| JP | 11190092 | A | 7/1999 | |
| SU | 1222914 | A | 4/1986 | |
| WO | 2005017274 | A1 | 2/2005 | |

OTHER PUBLICATIONS

Translation of WO 2005/017274. Huwer, T. Connecting System for Profiled Rails. Feb. 24, 2005. (Year: 2005).*

* cited by examiner

CONNECTING ELEMENT WITH PROFILE RAILS

CROSS-REFERENCE TO RELATED APPLICATIONS

This application is the United States national phase of International Application No. PCT/EP2014/002304 filed Aug. 22, 2014, and claims priority to German Patent Application No. 20 2013 007 676.3 filed Aug. 28, 2013, the disclosures of which are hereby incorporated in their entirety by reference.

BACKGROUND OF THE INVENTION

Field of the Invention

The present invention relates to a connecting element for connecting two aligned C-shaped profile rails, wherein the connecting element is constituted as a sheet metal profile, the cross-section whereof, adapted to the profile rails to be connected, is constituted in such a way that said sheet metal profile can be slid from the front sides thereof into the profile rails in a captive manner.

Description of Related Art

Such connecting elements are widely known. They usually sit with very little play in the profile rails, in order to be able to duly connect the latter as far as possible free from play. With the aid of the connecting elements, it is possible to produce ceiling constructions in fairly large rooms, wherein a plurality of profile rails have to be disposed aligned one behind the other in order to bridge the room length.

The problem with the assembly consists in the fact that the connecting element can only be accessed with difficulty during the assembly of the last profile rail. Especially in the case of profile rails, the opening whereof faces upwards, the assembler must then displace the connecting element blind, for example standing on a ladder, in order to produce the connection between the rails. Since he is not able to visually check the position of the connecting element, there is also the risk of the connecting element not being slid far enough into the profile rail positioned last. The problem is made worse by the fact that the profile rails are produced in a relatively imprecise manner, so that occasionally the displacement requires a great deal of force.

The problem of the present invention consists in providing a connecting element which permits easier handling during the assembly of constructions for the suspension of ceilings.

SUMMARY OF THE INVENTION

According to the invention, the problem is solved by the fact that there is moulded onto or mounted on the connecting element at least one handling tab that is accessible after the sliding-in into the profile.

It has been shown that, by this relatively simple measure, the assembler is able, even when the position of the connecting element is concealed, to touch the tab and to slide the connecting element into the profile rail obscuring the view, wherein the tab can be constituted by simply repositioning a sheet metal tab in the case of a connecting element constituted as a sheet metal profile. The tab also allows him to exert sufficient force on the connecting element and also provides the assembler, through its position, with feedback as to how far the connecting element has been slid into the profile rail to be assembled. Moreover, the tab also provides a handling advantage when connecting profile rails which are not concealed.

The connecting element preferably has an essentially C-shaped cross-section, which with correspondingly reduced dimensions can be inserted into the profile rails. Furthermore, the lateral legs of the connecting element are preferably constituted separated into two steps by a shoulder. This embodiment has the advantage that the lateral legs on the one hand are able to yield in a resilient manner in the case of dimensional deviations when the connecting element is inserted into the profile rail. On the other hand, the possibility exists with a further preferred embodiment of constituting the ends of the legs for an extensive contact area at the inner side of the legs of the profile rail. It thus becomes possible, for example with the aid of a crimping tool, to connect the profile rails durably with the connector by crimping in the end position of the connecting element. The stepped embodiment of the legs, in contrast with bent-off legs, offers the advantage that the additional crimping is simplified as a fixing, since a particularly large contact area can readily be achieved by increasing the height of the step.

In a further preferred embodiment of the invention, provision is made such that a resilient detent lug for snapping into the joint between the profile rails is provided on a holding plate of the connecting element, i.e. on the element connecting the legs, on the side of said connecting element facing away from said legs. Such a detent lug, which for example can be constituted as a resilient sheet metal tab, fixes the connecting element at least provisionally in the end position, wherein, in the case of upwardly facing legs of the profile rail and therefore concealed fitting of the connecting element, the detent lug snapping into the joint also gives the assembler visual feedback that the end position is reached.

In a further preferred embodiment of the invention, provision is made such that canted portions or rounded portions for facilitating the sliding-in into the profile rail are provided at the front sides of the connecting element. Such canted portions or rounded portions can be provided for example by repositioned sheet metal lugs on the legs or in the region of the holding plate between the legs. A canted portion can also be provided in the region of the shoulder between the steps of the legs, wherein in this case the edge region of the leg that forms the contact area is constituted shorter than the remaining region of the legs.

BRIEF DESCRIPTION OF THE DRAWINGS

An example of embodiment of the invention is dealt with below in greater detail with the aid of the appended drawings. In the figures.

DETAILED DESCRIPTION OF THE INVENTION

Figure 1:
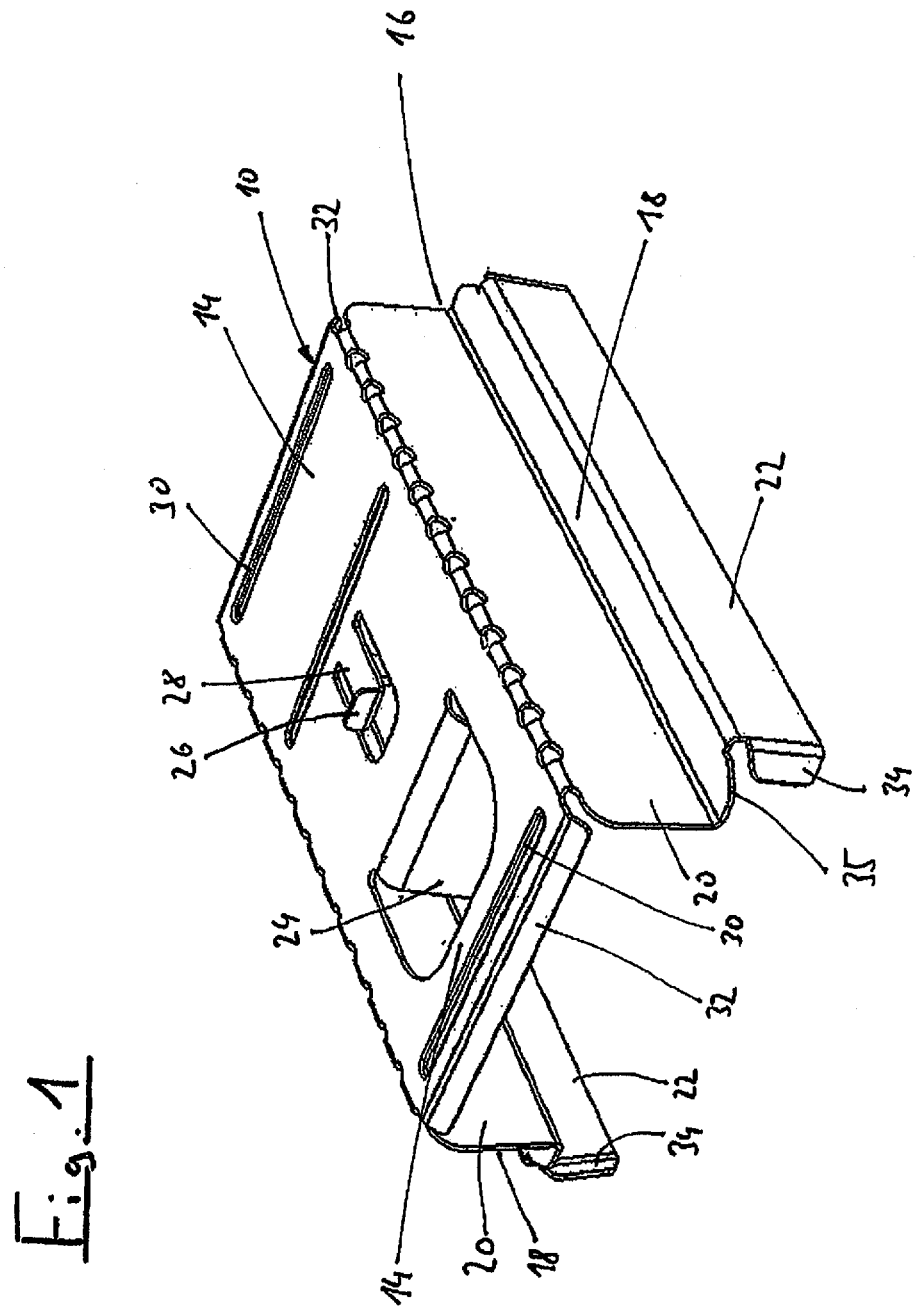
FIG. 1 shows an oblique view of a connecting element.
Figure 2:
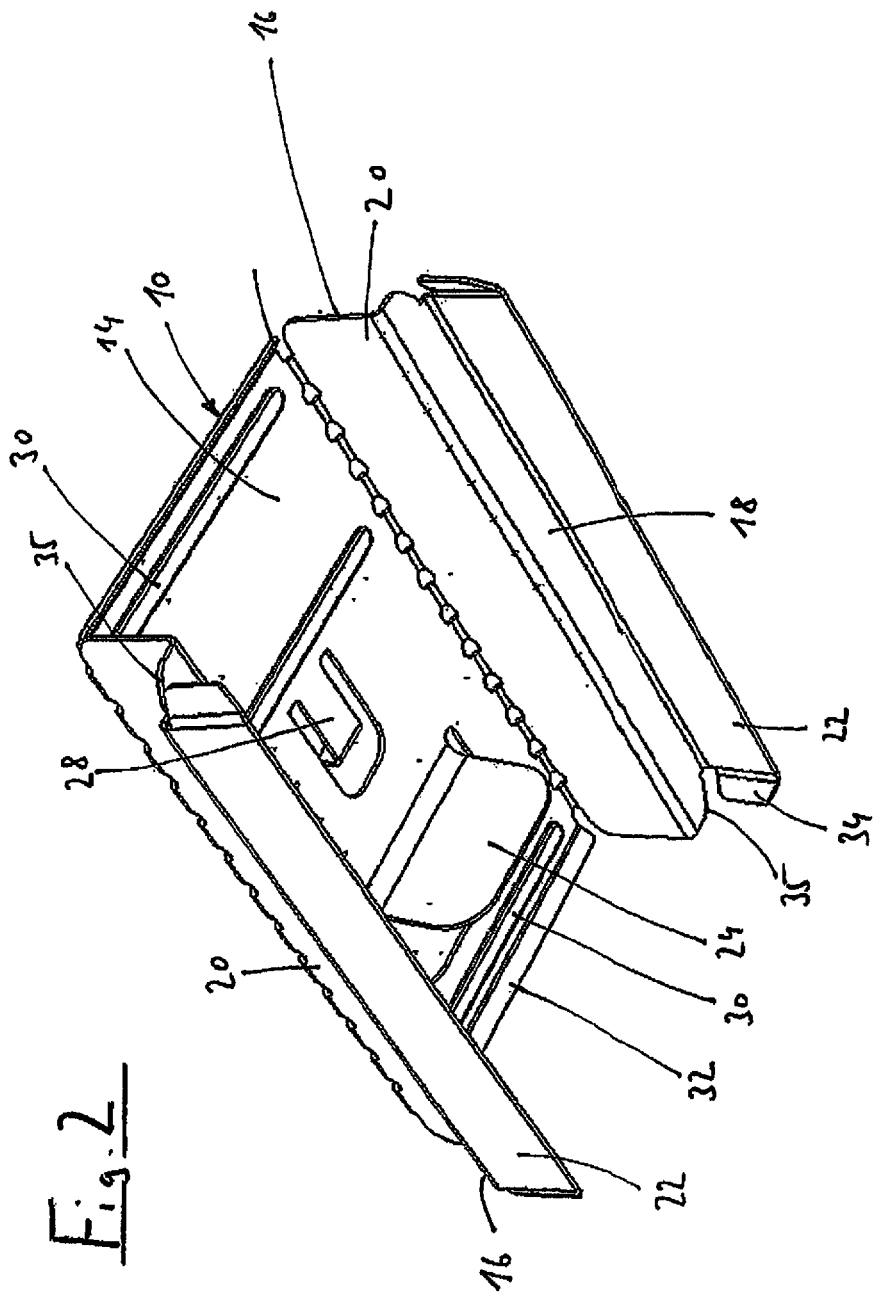
FIG. 2 shows an oblique view of the connecting element from FIG. 1 from beneath.

FIG. 1 shows a connecting element 10, which is intended for connecting C-shaped profile rails 12 (see FIGS. 3 and 4), when the latter lie aligned with one another. The connecting element comprises a holding plate 14 with lateral legs 16 and is formed in one piece completely from sheet metal. The lateral legs are divided by shoulders 18 into connecting regions with a smaller distance from one another and edge regions 22, wherein the spacing of edge regions 22 is adapted to the width of the profile rails to be connected, so that the outer surfaces of these regions 22 can lie with a contact area against the inner sides of the profile rails. The stepped structure of the legs enables elastic yielding of edge regions 22 inwards, so that in the initial state the spacing of the outer surfaces of these regions can be slightly greater than the inner width of the profile rails. Especially with regard to measurement tolerances in the commercially available C-shaped profile rails, this can be advantageous for rendering the sliding forces in the profile rails more uniform.

A handling tab 24 is repositioned downwards in holding plate 14, i.e. between legs 16. A detent lug 26 is constituted at the upper side, said detent lug being disposed on a resilient sheet metal tab 28. Furthermore, cross braces 30 can be seen, which increases stability of the connecting element.

First canted sheet metal tabs 32 are provided at the front sides of holding plate 14, said sheet metal tabs ensuring, like second canted sheet metal tabs 34 on the front sides of edge regions 22 of legs 16, that the connecting element can be slid more easily into a profile rail. Edge regions 32 of legs 16 are constituted shorter than regions 20 between shoulders 18 and holding plate 14, wherein the front sides of shoulders 18 have correspondingly rounded areas 35, alternatively also canted areas, in order also to simplify the sliding-in into the profile rail.

Figure 3:
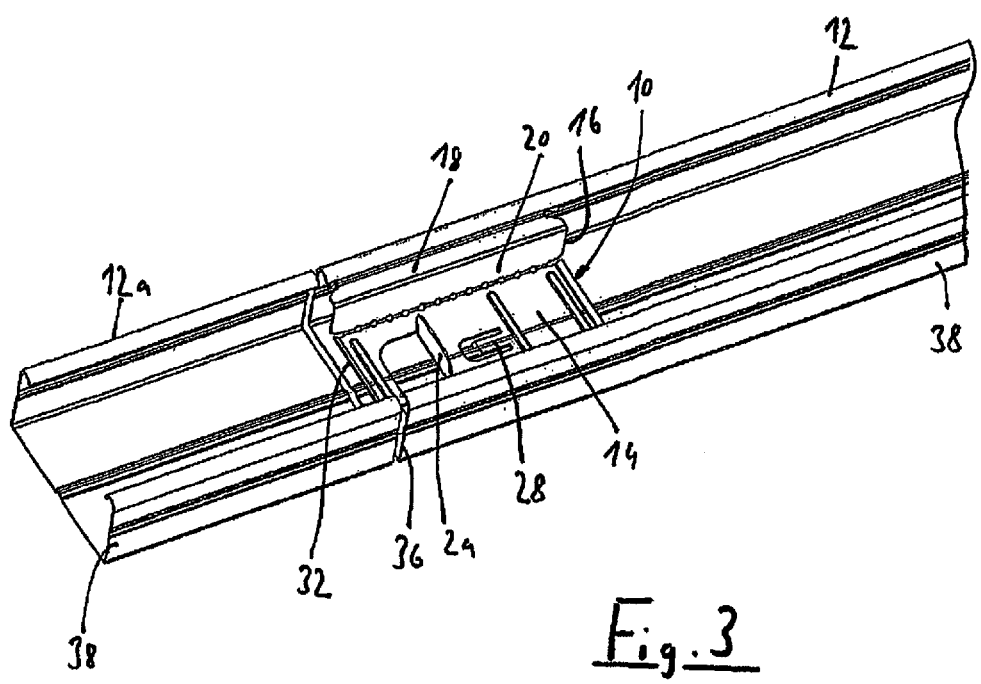
FIG. 3 shows a profile rail with the slid-in connecting element with a profile rail to be connected.
Figure 4:
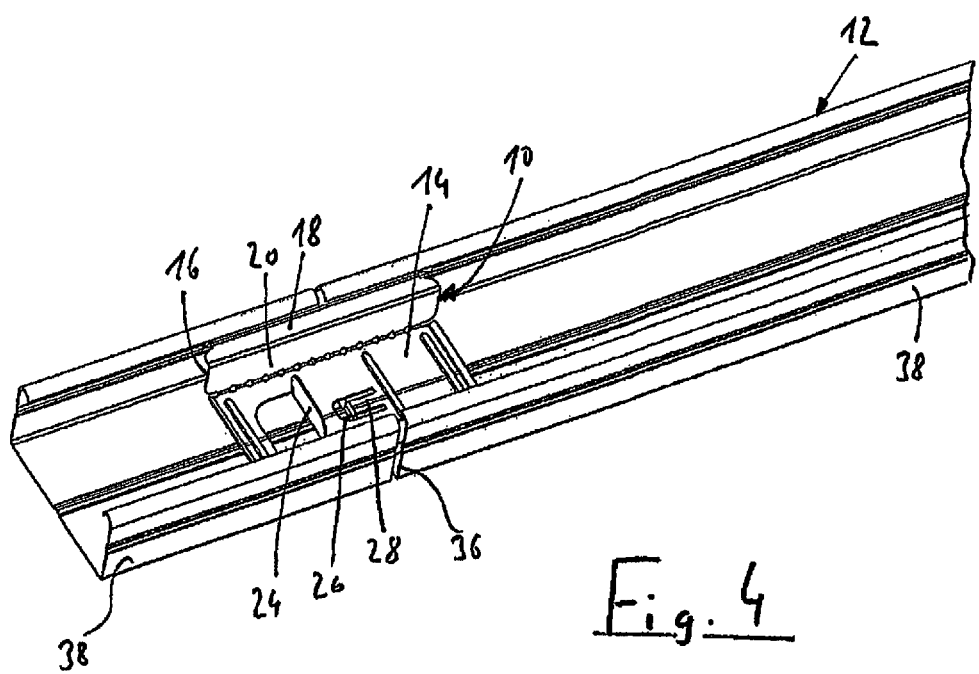
FIG. 4 shows a view of an assembly position with the connecting element in an end position.

FIG. 3 shows a connecting element which is slid into a profile rail 12. The figure shows an oblique view from above, wherein profile rail 12, into which connecting element 10 is slid, is already fixed at the ceiling side.

Second profile rail 12a shown in FIG. 3, which can also already be fixed at the ceiling side, is aligned and is intended to be connected permanently aligned with the profile rail 12. For this purpose, the assembler can access profile rail 12 from above and touch handling tab 24. He can slide connecting element 10 into profile rail 12a to be fixed, until detent lug 26 snaps into joint 36 between profile rails 12, 12a. This snapping-in is on the one hand perceptible and also visible when viewed from beneath, so that the assembler receives reliable feedback that the connecting element has arrived in the optimum end position.

In order to achieve a permanent connection, it is readily possible to employ a crimping tool in order to connect edge regions 22 of legs 16 of connecting element 10 permanently with legs 38 of the profile rail.

The invention claimed is:

1. A connecting element for connecting two aligned C-shaped profile rails, wherein the connecting element is constituted as a sheet metal profile comprising a holding plate with lateral legs, the cross-section of the sheet metal profile, adapted to the profile rails to be connected, is constituted in such a way that said sheet metal profile can be slid from front sides thereof into the profile rails in a captive manner, wherein there is moulded onto or mounted on the connecting element between the front sides a handling tab that is accessible both before and after the sliding-in into the profile rail, wherein the handling tab is repositioned downwards in the holding plate between the lateral legs, and wherein a resilient detent lug for snapping into a joint between the profile rails is provided on the holding plate of the connecting element, and wherein the lateral legs extend beyond the handling tab in a direction in which the handling tab extends from the holding plate.

2. The connecting element according to claim 1, wherein the connecting element has a C-shaped cross-section.

3. The connecting element according to claim 2, wherein the lateral legs of the connecting element comprise two regions stepped by means of a shoulder.

4. The connecting element according to claim 3, wherein the ends of the legs of the connecting element are configured to contact the inner sides of the legs of the profile rails to facilitate crimping the connecting element to the profile rails.

5. The connecting element according to claim 3, wherein there are provided at the front sides canted portions or rounded portions for facilitating the sliding-in into the profile rails.

6. The connecting element according to claim 5, wherein first canted portions or rounded portions in the region of the holding plate of the connecting element are formed by bent-off sheet metal tabs.

7. The connecting element according to claim 5, wherein second canted portions or rounded portions in the region of the ends of the legs are constituted by sheet metal tabs repositioned inwards.

8. The connecting element according to claim 5, wherein the shoulders comprise canted portions or rounded portions at the front sides, wherein the ends of the legs are shorter than the regions lying between the holding plate and the shoulders.

9. The connecting element according to claim 1, wherein the detent lug is moulded onto the holding plate as a resilient sheet metal tab.

* * * * *